US011939809B2

(12) United States Patent
Wegner et al.

(10) Patent No.: US 11,939,809 B2
(45) Date of Patent: Mar. 26, 2024

(54) METHOD FOR OPERATING A DOOR SYSTEM AND DOOR SYSTEM FOR SAME

(71) Applicant: dormakaba Deutschland GmbH, Ennepetal (DE)

(72) Inventors: Frank Wegner, Ennepetal (DE); Chandra Gupta, Ennepetal (DE); Martin Boeckhoff, Ennepetal (DE); Jelic Slobodan, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 229 days.

(21) Appl. No.: 17/668,077

(22) Filed: Feb. 9, 2022

(65) Prior Publication Data

US 2022/0268083 A1 Aug. 25, 2022

(30) Foreign Application Priority Data

Feb. 12, 2021 (EP) .................................... 21156782

(51) Int. Cl.
*G08B 21/00* (2006.01)
*E05F 15/73* (2015.01)

(52) U.S. Cl.
CPC ........ *E05F 15/73* (2015.01); *E05F 2015/767* (2015.01); *E05Y 2400/44* (2013.01); *E05Y 2900/132* (2013.01)

(58) Field of Classification Search
CPC ... E05F 15/73; E05F 2015/767; E05F 15/611; E05Y 2400/44; E05Y 2900/132; E05Y 2400/36; E05Y 2400/40; E05Y 2400/50
USPC ....................................................... 340/686.1
See application file for complete search history.

(56) References Cited

U.S. PATENT DOCUMENTS 5,583,405 A * 12/1996 Sai .......................... E05F 15/73 318/468
6,084,367 A 7/2000 Landert
2007/0094932 A1 * 5/2007 Hoshide .................. E05F 15/73 49/118

FOREIGN PATENT DOCUMENTS

| | | | |
|---|---|---|---|
| DE | 19613178 | A1 | 10/1997 |
| DE | 102007062473 | A1 | 7/2009 |
| DE | 102018104202 | A1 | 8/2019 |
| EP | 0696670 | A1 | 2/1996 |
| EP | 2418517 | A2 | 2/2012 |
| EP | 3613933 | A1 | 2/2020 |

* cited by examiner

*Primary Examiner* — Mark S Rushing
(74) *Attorney, Agent, or Firm* — CANTOR COLBURN LLP

(57) ABSTRACT

A method for operating a door system, wherein the door system has at least one door leaf, and wherein a sensor unit is configured and connected to a control unit of the door system, wherein the approach of a person to the door system is detected using the sensor unit, in particular designed as a radar sensor or as a camera, wherein the method has at least the following steps. Detecting an approach angle of the person, at which the person approaches the door system and opening the at least one door leaf at an opening width and/or at an opening speed, wherein the maximum opening width or the maximum opening speed is determined by the control unit as a function of the detected approach angle of the person. The method also relates to a door system with a control unit for carrying out the method.

15 Claims, 4 Drawing Sheets

METHOD FOR OPERATING A DOOR SYSTEM AND DOOR SYSTEM FOR SAME

CROSS-REFERENCE TO RELATED APPLICATIONS

This application is related to and claims the benefit of European Patent Application No. 21156782.1, filed on Feb. 12, 2021, the contents of which are herein incorporated by reference in their entirety.

TECHNICAL FIELD

The disclosure relates to a method for operating a door system, with the door system having at least one door leaf and with a sensor unit being configured and connected to a control unit of the door system, with the approach of a person to the door system being detected by means of the sensor unit, in particular designed as a radar sensor or as a camera. The disclosure also relates to a door system with a control unit for carrying out the method.

BACKGROUND

For example, EP 3 613 933 A1 shows a method for operating an automatic door system which has a door actuator connected to a door leaf. It is indicated here that radar movement detectors are used to actuate the door movement for automatic sliding doors. For swing doors, radar sensors are not common for detecting monitored regions if the sensors ultimately detect people and transmit corresponding data to a control unit to control the door system.

DE 196 13 178 A1 discloses a method for operating an automatic door system and the door system can have a door leaf which can be actuated via a door actuator. Furthermore, sensor units are proposed which cooperate with a control unit and the control unit can be actuated using sensor data such that the door system is optimally operated. Optimum operation of the door system is in particular seen as the opening behavior of the door system adapting to the passage frequency of the passing people. Thus, if a greater number of people pass the door system, the opening behavior should be designed differently to if only a single person passes the door system. In this case, weather conditions, the time of day, the day of the week and, for example, also a temperature difference between the inside and outside of a building should also be taken into consideration. In this case, the ideal condition is indicated where a door should only open as far as is also necessary for one person or a plurality of people to pass through. In particular, the door should open and close at the correct location, for example if it concerns multi-leaf door systems, in particular sliding doors. It is ideal in this respect if a door leaf is actuated such that when passing the door system, a person can continue their passing movement in the movement path, but the door leaf does not open earlier than is necessary and also does not close later than is necessary. Thus, a smart door should be provided, making it possible to control the opening and closing behavior of a complete door system as a function of the traffic situation and of environmental conditions, such as temperature, wind, pressure difference, need for air exchange and similar parameters.

SUMMARY

The disclosure therefore further improves a method for operating a door system as well as to provide such a door system with which the method according to the disclosure can be carried out. The improvement should in particular include utilizing further essential features, preferably the movement of the at least one person, to optimally actuate the door leaves of the door system which the person would like to pass. In this case, the optimal actuation is primarily seen as a door leaf not being held open for longer than is necessary, but without impairing the passage movement of the passing person.

This is achieved by providing a method for operating a door system according to claim 1 and proceeding from a door system according to claim 13 with each of the characterizing features. Advantageous further developments of the disclosure are indicated in each of the dependent claims.

According to the disclosure, the method provides for at least the following steps: Detecting an approach angle of the person, at which the person approaches the door system and opening the at least one door leaf at an opening width and/or an opening speed, with the maximum opening width and/or the maximum opening speed being determined by the control unit as a function of the detected approach angle of the person.

The core idea of the disclosure is to detect the approach angle of the person, which is detected using the sensor unit and transmitted to the control unit. Then, in addition to other parameters, the control unit can take into account the angle from which the person approaches the door system. Thus, the door leaf can be actuated differently with the door actuator of the door system if the person approaches the door from one side than if the person moves towards the door perpendicularly, for example. Optimizations can be derived from this in order for example to only open the door leaf as wide as is actually necessary. Therefore, not only is the advantage of optimal control of the door achieved, in particular in order not to open the door leaf for longer or wider than is necessary, the wearing of the door system and of the door actuator as well as the power consumption are also reduced.

According to the disclosure, the method can be carried out using a door system, in which the door leaf has a hinge side and a closure side, with the opening width of the door leaf being set to be smaller if the person approaches the door system from the direction of the closure side than if the person approaches the door system from the direction of the hinge side, with the opening width of the door leaf consequently being set to be greater if the person approaches the door system from the direction of the hinge side than if the person approaches the door system from the direction of the closure side. The closure side is the side at which the handle set, a pressure rod, a pressure grip or the like is attached to the door leaf.

The core idea of adapting the opening width of the door leaf is the spatial adaptation to the approach direction of the person to the door system and if the person approaches the door system from the closure side, for example passing at an acute angle to the wall on which the door system is configured, then it is sufficient if the door leaf only opens for example 45°, it does not have to have a 75° opening angle in this respect. In contrast, if the person approaches from the hinge side, the person must then go around the door leaf to a certain extent. In order to make walking around the door leaf as comfortable and unnecessarily wide as possible, the door leaf does not open for example just 45°, but rather at least 75° in order to provide the person entering with a door opening that is as wide as possible and recommended as comfortable.

According to the disclosure, the method also provides for the opening speed of the door leaf to be set to be smaller if the person approaches the door system from the direction of the closure side than if the person approaches the door system in the direction of the hinge side, and with the opening speed of the door leaf consequently being set to be greater if the person approaches the door system from the direction of the hinge side than if the person approaches the door system from the direction of the closure side. If, for example, the person approaches the door system from the closure side, then an opening angle of for example 45° may be sufficient. In order to move the door leaf only to 45° opening width in the same movement duration, the door leaf can be moved more slowly in order to move to 45° in the same time as when the door leaf is moved to an opening width of 75°. As a result, energy can also be saved in this respect with the reduction in the movement speed and the material loading of the door system, in particular of the door actuator, is reduced.

On the other hand, it may be sufficient to detect the person later in the near-wall region which is also naturally the case with radar sensors. The optimal coverage of a detecting radar field moves for example from +50° to −50° around an angle of 0° which is perpendicular to the closed door. Consequently, lateral areas of somewhat poorer detection result such that the person must approach the door more closely from the edge area in order to ultimately be detected. However, since the opening width of just 45° is for example sufficient if the person approaches the door system for example from the closure side, then later detection of the need to open is not significantly disadvantageous.

The opening time is determined so that, using the distance-time law, it is first determined when the person will reach the door system. The opening duration must be considered minus this time, with a safety time also being factored in. The total time between the detection of the person and the start of the door movement can, however, be shorter due to a smaller opening angle when approaching the door in an oblique manner, for example from the direction of the closure side, since the door only requires a shorter time up to max. 45° opening angle than up to max. 75° opening angle. A person, who moves straight towards the door, thus approaches the door from an angle of 0°, will trigger an opening of the door, in the case of which the door leaf generally opens to 75°.

According to a further embodiment of the method, the door system can have a first door leaf and a second door leaf, with the opening width and/or the opening speed of the first door leaf and the opening width and/or the opening speed of the second door leaf being determined as a function of the approach angle of the person by means of the control unit in such manner that the opening widths and/or the opening speeds differ from one another if the approach angle is greater or less than 0° and/or that the opening widths and/or the opening speeds are the same if the approach angle is 0°, with the 0° corresponding to a perpendicular to the flat door leaf. Therefore, in the case of a 2-leaf door system, the behavior of the individual door leaf can also be controlled as occurs in the case of a door system with only one leaf. The special case may also arise where only a single door leaf opens when a person, who approaches the door system at an angle, is detected. Preferably, the door leaf should be opened on the side from which the person approaches the closure side.

Furthermore, the method according to the disclosure provides that the size of the person is detected and/or determined by means of the sensor unit and/or by means of the control unit, with the approach angle and the size of the person being correlated to one another by means of the control unit to form a first correlation value and the opening width and/or the opening speed being determined by means of the control unit from the first correlation value. This generates a further improvement of the door control, in particular the door leaf can be prevented from adopting only a reduced opening width in the case of very large people if the very large person approaches for example at an angle from the closure side of the door leaf. The size of the person also includes people, who for example have items with them, in particular a wheelchair, a walker, luggage, a hospital bed, a trolley or the like.

A further development of the method according to the disclosure proposes that the approach speed of the person, at which the person approaches the door system, is detected and/or determined by means of the sensor unit and/or by means of the control unit. In the case of a greater approach speed, the opening time is in this case set to be earlier by means of the control unit than in the case of a lower approach speed. Similarly, in the case of a greater approach speed, the opening speed of the at least one door leaf is determined so as to be greater than in the case of a lower approach speed. In the same way, in the case of a lower approach speed, the opening time is determined so as to be later than in the case of a high approach speed and/or in the case of a lower approach speed, the opening speed of the at least one door leaf is determined so as to be lower than in the case of a higher approach speed.

According to a further configuration of the disclosure, a movement vector, which is used as a parameter for the opening width and/or the opening speed of the at least one door leaf, is determined by means of the control unit from the approach angle and from the approach speed. If the size of the person is also detected, a movement vector is then formed with the additional information about the size of the person. The movement vector can also be designated here as a person vector since a separate movement vector is generated for each person when a plurality of people approaches the door system. In particular, a separate movement vector can be generated for each person using the additional size information about the person.

It is thus also provided that when the size of the person is detected and/or determined by means of the sensor unit and/or by means of the control unit, the movement vector and the size of the person are correlated to one another by means of the control unit to form a second correlation value which is used alone or additionally as a parameter for the opening width and/or the opening speed of the at least one door leaf.

It is also provided that, on a first side of the door system, a first sensor unit and, on the second side of the door system, a second sensor unit are provided, which are in particular designed as a radar sensor or as a camera, with the movement vector of the person being formed over both sides of the door system and/or with the movement vector being able to be determined by the sensor unit by way of calculation in an inner region of the door system between the sensor units not detected with the sensor units.

If a sensor unit on the first side of the door system detects an incoming person, then this person can be tracked using a movement vector until just before the door system itself, but detection using radar sensors or using the camera is no longer provided in the direct movement region of the door leaf. On the exit side of the door, the person is in this case recorded again by the other sensor unit until finally the person leaves the exit region of the door system and the second sensor unit can register the person leaving. The movement vector of the person can in this case be retained from the first detection of the person on the arrival side until the person leaves on the exit side, with the movement vector consequently also forming the guide variable to control the door leaf by means of the control unit.

The vector formation is in this respect enabled if the sensor unit has a radar sensor or a camera. Radar sensors in particular allow not only a presence of a person to be detected, but rather radar sensors can detect the distance of the person, the movement speed and the movement direction and it is possible to differentiate, using radar sensors, an approach or an increasing distance of a person. The same features are also possible using a camera and a corresponding image evaluation. In this case, the movement vector can already be generated by means of the sensors particularly advantageously such that only vector data of the detected objects are sent to the controller. From the information for example of both sensors, i.e. on the approach side and the exit side of the door system, the controller determines how the person is actually moving and, in the process, also calculates probable movements, in particular the direction of the movement path and the speed of the person in order to consequently optimally actuate the movement of the door leaf. Thus, the person can pass the door system with the highest level of comfort without the at least one door leaf still remaining open for an unnecessarily long time.

It is even more advantageously provided that a haptic interaction between the person and the door leaf is detected by the control unit, with the haptic interaction with the movement of the door leaf or with the door leaf in the opening position being detected by the control unit and saved permanently or briefly as a correction factor such that future movements of the door leaf, in particular the maximum opening width and/or the opening speed and/or the opening time of the door leaf and/or the strength of a servo-assisted system are adjusted by the control unit on the basis of the correction factor. Thus, a learning door controller can be achieved by the control unit storing empirical values and correlating them with actually collected data.

Thus, it can for example be detected whether, in the case of a predefined opening speed of the door leaf, people regularly push the door leaf in the opening direction or whether no haptic interaction takes place. If the door leaf is regularly pushed in the opening direction, then the controller can derive for example information therefrom to, in future, either open the door leaf earlier or increase the opening speed. As a result, the door controller itself can be optimized, with optimized operation for different people, who ultimately all no longer perform a haptic action on the door leaf/leaves.

Lastly, it is also provided that the opening time is calculated by means of the control unit, with the opening time being determined from the current distance and the approach speed of the person relative to the door system by means of the distance-time law, with the opening time being brought forward by the opening duration to open the door leaf and also by a buffer time. This prevents a person walking into the opening door leaf and the door leaf should already be open at the predefined opening width if the person actually approaches the door leaf directly.

The sensor units usually have a main detection region, with at least one of the sensor units, in particular the radar sensor or the camera, being mounted on or in the region of the door system such that the main detection region is directed in the direction of the closure side of the door leaf by the sensor unit, in particular the radar sensor or the camera, being arranged rotated from a middle position of 0°, with the detection angle of the main detection region rotated towards the middle position being calculated by means of the control unit. As a result, the weaker lateral detection region, in particular from the closure direction, is smaller such that people, who approach the door system at an acute angle to the wall in which the door system is installed, are also detected more quickly. The main detection region can in this case be rotated so far in the direction of the closure side of the door leaf that an area of poorer detection of people is practically no longer present. The naturally increasing area of poorer detection from the direction of the hinge side of the door leaves is unproblematic for people who approach a door system from the hinge side of the door leaves since they maintain a greater distance to the wall in any case because it is subconsciously clear to every person approaching a swing leaf door that when the person approaches closer to the wall, the door leaf would open counter to the direction of travel of the person. In this respect, the normal behavior of the people, who approach a door system, allows for such a rotation of the main detection region of radar sensors.

The disclosure is also aimed at a door system with a door actuator to carry out the previously described method. In this case, it is provided that the sensor unit has at least one radar sensor or one camera, with an approach angle of a person approaching the door system being detectable and/or determinable by means of the radar sensor or the camera and that the control unit is configured such that the at least one door leaf is opened at an opening time, at an opening width and/or at an opening speed as a function of the detected approach angle of the person.

Advantageous further developments of the door system are indicated in the description and in the figures. Features and details, which are described in connection with the method according to the disclosure, also apply here in connection with the door system according to the disclosure and vice versa. In this case, the features mentioned in the description and in the claims may each be essential to the disclosure individually by themselves or in combination. In particular, a door system is being protected, with which the method according to the disclosure, in particular according to claims 1 to 12, can be carried out, as well as a method according to claims 1 to 12, which can be carried out with the door system according to the disclosure as claimed in claim 13.

The door system according to the disclosure is also configured such that an approach speed of a person approaching the door system is detectable and/or determinable by means of the radar sensor or the camera, with the control unit being configured such that the at least one door leaf is opened at an opening time, at an opening width and/or an opening speed as a function of the detected approach speed of the person.

The sensor units have a main detection region, with at least one of the sensor units, in particular the radar sensor or the camera, being mounted on or in the region of the door system such that the main detection region is directed in the direction of the closure side of the door leaf by the sensor unit, in particular the radar sensor or the camera, being arranged rotated from a middle position of 0°.

The door system can in this case be designed as an in particular automatic sliding door system, as a folding leaf door system, as a swing leaf door system or as a revolving door system.

The disclosure is also aimed at a computer program product for implementation in a control unit of a door system with the features described above, which is designed to carry out the method according to the disclosure in accordance with the description above.

BRIEF DESCRIPTION OF THE DRAWINGS

Further measures that improve the disclosure will be outlined in greater detail below together with the description of a preferred exemplary embodiment of the disclosure on the basis of the figures, which show.

DETAILED DESCRIPTION OF THE DRAWINGS

Figure 1:
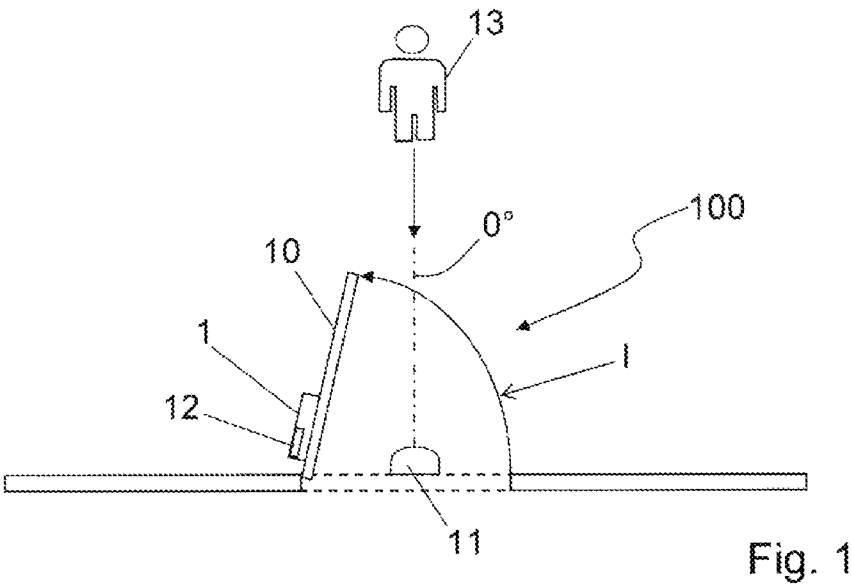
FIG. 1 a schematic view of the door system with a person walking towards the door system perpendicularly and the door leaf has been opened for example by 75°, FIG. 2 the arrangement of the door system according to FIG. 1 in a plan view, with the person approaching the door system obliquely from the closure side and the door leaf being opened for example by 45°, FIG. 3 a door system with sliding leaves, with the person approaching the door system centrally and perpendicularly, FIG. 4 the door system with sliding leaves according to FIG. 3, with the person approaching the door system at an angle, FIG. 5 a side view of the door system with a person on the approach side and with a person on the exit side, and FIG. 6 the door system with a sensor unit rotated to the closure side of the door system.
Figure 2:
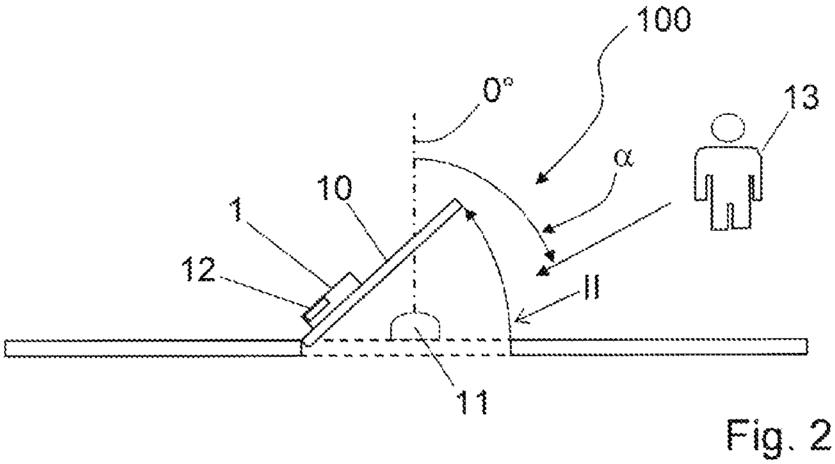

FIGS. 1 and 2 each show a door system 100 with a door leaf 10 which can be swiveled by means of a door actuator 1. The door leaf 10 has a hinge side for this purpose which is represented on the left side of the door leaf 10 and forms the pivot point of the door leaf and the free side of the door leaf 10 forms the closure side which has a fitting of the door leaf 10 in a manner not shown in more detail. FIG. 1 shows here the door leaf 10 with a first opening width I, which is for example 75°, and FIG. 2 shows the door leaf 10 in a second opening width II, which is for example 45°. The door leaf 10 is located in the closed position, consequently in a 0° position.

FIG. 1 shows a person 13 who moves perpendicularly towards the door system 100. This perpendicular position forms an approach angle of 0°, whereas in FIG. 2 the person 13 is shown who approaches the door system at an approach angle α, for example at 30°.

The comparison of the FIGS. 1 and 2 shows that, in the case of a person 13 approaching obliquely from the hinge side, the door leaf 10 does not open as wide as in the case of a person 13 approaching the door system 100 perpendicularly, i.e. from the direction of 0°. The method for carrying out the disclosure provides in this case that the approach angle α of the person 13 is detected using a sensor unit 11 and the approach angle α forms the angle of the person 13 to the perpendicular direction of 0°, at which the person 13 moves obliquely towards the door system, the method also provides that the door leaf 10 opens either at the first opening width I or at the second opening width II, which depends on the detected approach angle α. Additionally, a first or second opening speed can be provided when opening the door leaf 10, and, in the case of a greater first opening width I, the opening speed results with a greater value than in the case of a smaller second opening width II.

Figure 3:
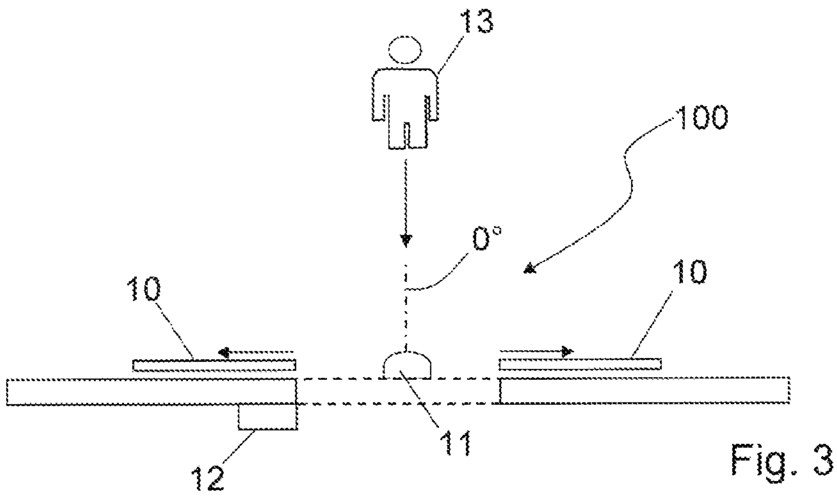
Figure 4:
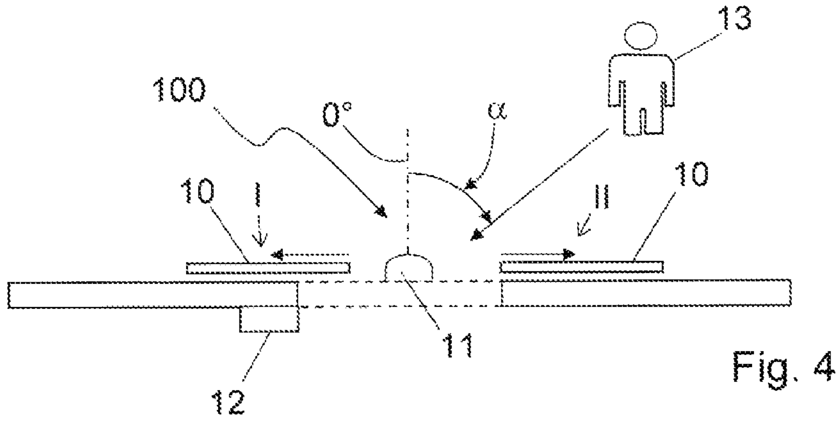

FIGS. 3 and 4 each show door systems 100 with door leaves 10 configured to move in a sliding manner and the movement of the door leaves 10 is controlled via the control unit 12. The sensor unit 11 is for example shown only on an approach side of the door system 100, it can also be present in an identical manner on the exit side of the door system 100.

In FIG. 3, the person 13 approaches from the perpendicular of the door system 100, reflected with the angle 0° and the two door leaves 10 open along the same path and at the same speed.

In FIG. 4, the person 13 approaches at the angle α to the perpendicular at 0° and the example shows that the door leaf 10 is opened further on the approach side of the person 13 than the door leaf 10 on the side facing away from the approach side. In this case, the door leaf 10 on the left side facing away from the approach can still of course open by a certain distance and the door leaf 10 on the right side does not also have to open fully. The opening widths of both door leaves 10 ideally enable a passage section for the movement path of the person 13, as they walk through the door system 100. For example, the left door leaf 10 in this case presents the smaller first opening width I and the right door leaf the greater second opening width II.

The movement of the door leaves 10 is controlled via a control unit 12 which is electrically connected to the at least one sensor unit 11 in a manner not shown in more detail. The sensor unit 11 is for example a radar sensor or a camera, which allows not only the presence of the person 13 to be detected, but rather the sensor unit 11 can also detect the distance of the person 13 from the door system 100 as well as the angle α, at which the person 13 approaches the door system 100. Moreover, a radar sensor or a camera with a corresponding image evaluation system can determine the approach speed of the person 13.

Figure 5:
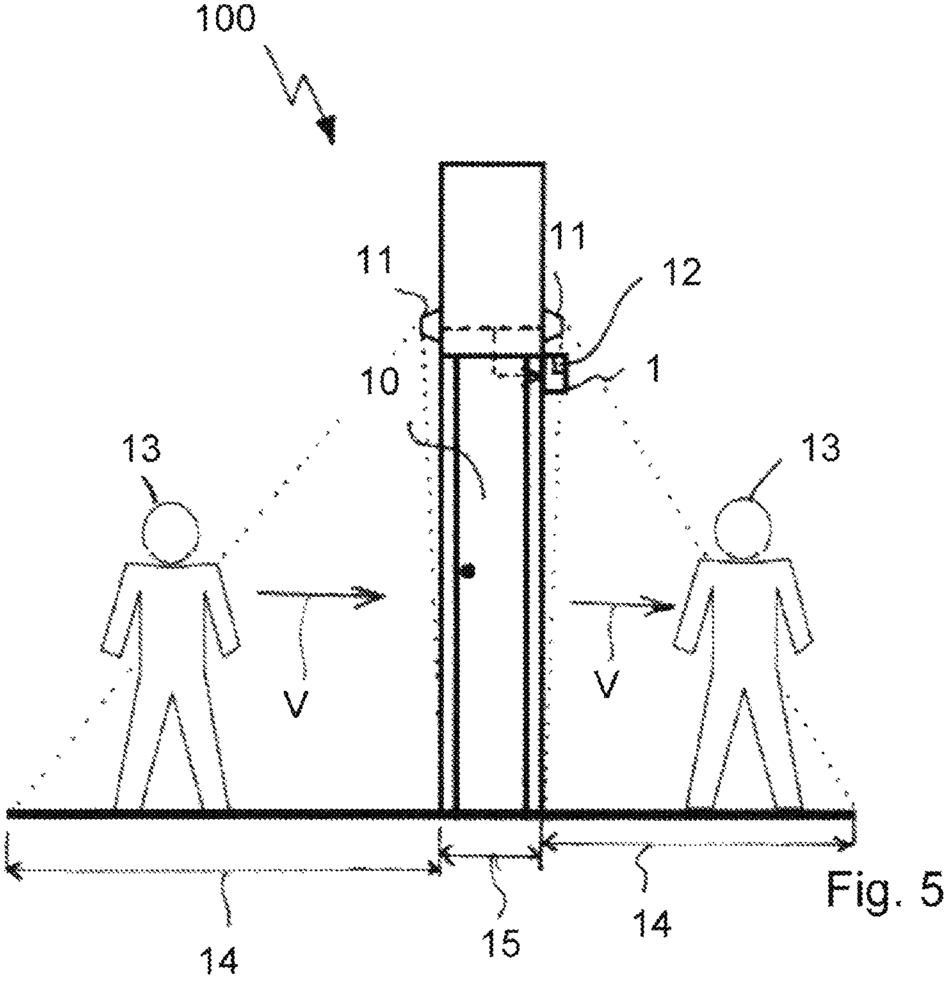

FIG. 5 shows a door system 100 with a door actuator 1 for actuating a door leaf 10 and a sensor unit 11 is arranged on both sides of the door system 100. A detection region 14 can in each case be detected using the sensor unit 11 such that people 13 located inside the detection region 14 can be detected using the sensor units 11. An inner region 15, which cannot be monitored using the sensor units 11, is located between the two detection regions 14, in particular directly inside or below the door system 100 and the door leaf 10 respectively. The sensor units 11 are in this case configured such that a movement vector V can be determined, which results from an approach angle and the approach speed of the person 13 who approaches the door system 100. The movement vector V in this case forms the parameter for the opening widths I, II, at which the door leaf or door leaves 10 should be opened; similarly, the opening speed of the door leaf 10 can be determined on the basis of the parameter, based on the movement vector V. The movement vector V can in this case be formed beginning from the detection region 14 on the approach side up to the end of the detection region 14 on the exit side of the door system 100. The inner region 15, which cannot be detected using the sensor units 11, can also be determined by way of calculation. Consequently, a continuous, single movement vector V, which is calculated in real time for each section of the approach, can be determined from the two individual movement vectors V shown by way of example.

Figure 6:
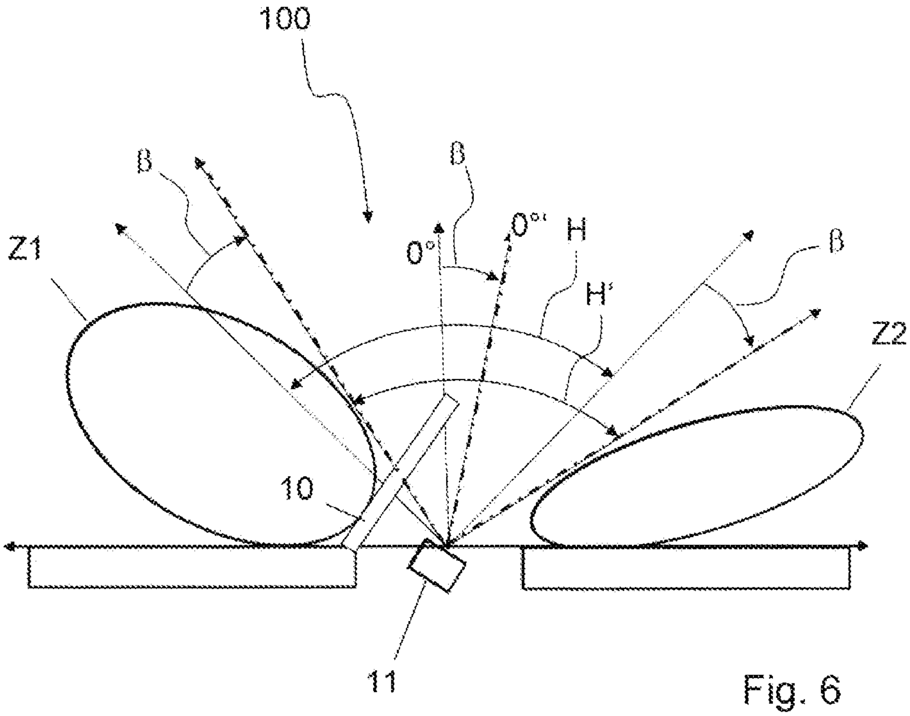

FIG. 6 shows a door arrangement 100 with a sensor unit 11 which is rotated in the direction towards a closure side of the door leaf 10. The sensor unit 11 is for example a radar sensor, which is fixedly arranged, and in this respect is no longer rotated during the permanent operation of the door system 100.

The sensor unit 11 designed as a radar sensor has a main detection region H, which, in the non-rotated arrangement, has a central axis of 0° orthogonal to the door system 100.

This main detection region H extends for example from −50° to +50° around the 0°. If the sensor unit 11 rotates by a rotation angle β, then a rotated main detection region H' also results. The then applicable 0° are drawn in with dashed lines with the two boundaries of the main detection region H'.

The regions which cannot be detected further with full field strength or are no longer detectable, in addition to the main detection region H', are drawn in as a wide area Z1 and a narrow area Z2. If the sensor unit 11 were not rotated, both areas Z1 and Z2 would be the same size. However, the rotation results in a narrow area Z2 from the direction of the closure side of the door leaf 10, whereas, on the hinge side of the door leaf 10, the area spreads out such that a wider area Z1 results.

Since the narrow area Z2 has been reduced by the sensor unit 11 being rotated, people can then be detected in an improved manner when they approach the door system 100 from the narrow area Z2 or in the edge region to the adjoining main detection region H'. This results in the advantage of an improved function during the operation of the door system 100 such that people, who approach from the closure side, can be better detected. People, who approach the door system 100 from the hinge side, naturally preferably walk around the wide area Z1 since people know that the door has an opening direction which is counter to the direction of travel. In this respect, an enlargement of the wide area Z1 on the hinge side of the door leaf 10 is not necessarily disadvantageous. The design of the disclosure is not restricted to the preferred exemplary embodiment indicated above. In fact, a number of variants is conceivable which make use of the solution represented even in the case of essentially different embodiments. All features and/or advantages, including constructive details or spatial arrangements, which emerge from the claims, the description or the drawings, may be essential to the disclosure by themselves and in the most varied combinations.

The invention claimed is:

1. A method for operating a door system, wherein the door system has at least one door leaf, and wherein a sensor unit is configured and connected to a control unit of the door system wherein the approach of a person to the door system is detected by the sensor unit, wherein the method includes at least the following steps:

detecting an approach angle of the person, at which the person approaches the door system, and opening the at least one door leaf at an opening width and/or at an opening speed, wherein the maximum opening width and/or the maximum opening speed is determined by the control unit as a function of the detected approach angle of the person.

2. The method according to claim 1, wherein the door leaf has a hinge side and a closure side, wherein the opening width of the door leaf is determined so as to be smaller if the person approaches the door system from the direction of the closure side than if the person approaches the door system from the direction of the hinge side, and wherein the opening width of the door leaf is determined so as to be greater if the person approaches the door system from the direction of the hinge side than if the person approaches the door system from the direction of the closure side.

3. The method according to claim 1, wherein the opening speed of the door leaf is determined so as to be smaller if the person approaches the door system from the direction of the closure side than if the person approaches the door system from the direction of the hinge side, and wherein the opening speed of the door leaf is determined to be greater if the person approaches the door system from the direction of the hinge side than if the person approaches the door system from the direction of the closure side.

4. The method according to claim 1, wherein the door system has a first door leaf and a second door leaf, wherein the opening width and/or the opening speed of the first door leaf and the opening width and/or the opening speed of the second door leaf are determined by the control unit as a function of the approach angle of the person such that the opening widths and/or the opening speeds differ from one another if the approach angle is greater or less than 0 degrees and/or in that the opening widths and/or the opening speeds are the same if the approach angle is 0 degrees, wherein the 0 degrees corresponds to a perpendicular to the flat door leaf.

5. The method according to claim 1, wherein the size of the person is detected and/or determined by the sensor unit and/or by the control unit, wherein the approach angle and the size of the person are correlated to one another by the control unit to form a first correlation value and the opening width and/or the opening speed is determined by the control unit from the first correlation value.

6. The method according to claim 1, wherein the approach speed of the person, at which the person approaches the door system, is detected and/or determined by the sensor unit and/or by the control unit, wherein by the control unit in the case of a greater approach speed, the opening time is determined to be earlier than in the case of a lower approach speed and/or in that in the greater approach speed, the opening speed of the at least one door leaf is determined to be greater than in the lower approach speed.

7. The method according to claim 1, wherein a movement vector, which is used as a parameter for the opening width and/or the opening speed of the at least one door leaf, is determined by the control unit from the approach angle and from the approach speed.

8. The method according to claim 7, wherein the size of the person is detected and/or determined by the sensor unit and/or by the control unit, wherein the movement vector and the size of the person are correlated to one another by the control unit to form a second correlation value, which is used as a parameter for the opening width and/or the opening speed of the at least one door leaf.

9. The method according to claim 7, wherein on a first side of the door system, a first sensor unit and, on the second side of the door system, a second sensor unit are provided, wherein the movement vector of the person is formed over both sides of the door system and wherein the movement vector is determined by the control unit by way of calculation in an inner region of the door system between the sensor units not detected with the sensor units.

10. The method according to claim 1, wherein a haptic interaction between the person and the door leaf is detected by the control unit, wherein the haptic interaction with the movement of the door leaf or with the door leaf in the opening position is detected by the control unit and saved permanently or briefly as a correction factor such that future movements of the door leaf the maximum opening width and/or the opening speed and/or the opening time of the door leaf and/or the strength of a servo-assisted system are adjusted by the control unit on the basis of the correction factor.

11. The method according to one of the preceding claim 1, wherein the opening time is calculated by the control unit, wherein the opening time is determined from the current distance and the approach speed of the person relative to the door system by the distance-time law, wherein the opening time is brought forward by the opening duration to open the door leaf and a buffer time.

12. The method according to claim 1, wherein the sensor units have a main detection region, wherein at least one of the sensor units, is mounted on or in the region of the door system such that the main detection region is directed in the direction of the closure side of the door leaf by the sensor unit, being arranged rotated from a middle position of 0°, wherein the rotation angle of the main detection region rotated towards the middle position is calculated by means of the control unit.

13. A door system with a door actuator for carrying out a method according to claim 1, wherein the sensor unit has at least one radar sensor or one camera, wherein an approach angle of a person approaching the door system is detectable and/or determinable by the radar sensor or the camera and that the control unit is configured such that the at least one door leaf is opened at an opening time, at an opening width and/or at an opening speed as a function of the detected approach angle of the person.

14. The door system according to claim 13, wherein an approach speed of a person approaching the door system is detectable and/or determinable by the radar sensor or the camera, wherein the control unit is configured such that the at least one door leaf is opened at an opening time, at an opening width and/or at an opening speed as a function of the detected approach speed of the person.

15. The door system according to claim 13, wherein the sensor units have a main detection region, wherein at least one of the sensor units, is mounted on or in the region of the door system such that the main detection region is directed in the direction of the closure side of the door leaf by the sensor unit, being arranged rotated from a middle position of 0°.

* * * * *